United States Patent [19]

Sandbrook et al.

[11] 3,949,474

[45] Apr. 13, 1976

[54] CUTTING IMPLEMENT

[75] Inventors: Dennis Ronald Sandbrook; Harry Melling, both of Sheffield, England

[73] Assignee: John Cooper and Sons Limited, Sheffield, England

[22] Filed: Apr. 4, 1975

[21] Appl. No.: 565,100

[52] U.S. Cl. .................................. 30/260; 30/341
[51] Int. Cl.² .......................................... B26B 13/04
[58] Field of Search ............ 30/186, 260, 261, 341, 30/191, 193, 192, 187, 188, 236

[56] References Cited
UNITED STATES PATENTS

| | | | |
|---|---|---|---|
| 2,769,237 | 11/1956 | Oxhandler | 30/341 X |
| 2,939,213 | 6/1960 | Daniel | 30/260 |
| 3,372,482 | 3/1968 | Mercovelli | 30/260 X |

FOREIGN PATENTS OR APPLICATIONS

| | | | |
|---|---|---|---|
| 623,936 | 5/1949 | United Kingdom | 30/260 |

Primary Examiner—Al Lawrence Smith
Assistant Examiner—J. C. Peters
Attorney, Agent, or Firm—Fleit & Jacobson

[57] ABSTRACT

A cutting implement, such as a pair of secateurs, either of the anvil type or of the cross over type, in which two handles are pivotable relative to one another, the first of the handles including a removable blade having a pair of substantially parallel fingers which pass within one of the handles on either side of the pivot, and a detent is provided on one of the fingers and said other handle, a leaf spring, which normally urges the handles to an open position, holding the detent in engagement. In the anvil construction, the anvil is formed in one piece with the other handle, by bending two portions of the other handle in opposite directions, so that they both lie in a plane substantially perpendicular to the blade.

10 Claims, 4 Drawing Figures

CUTTING IMPLEMENT

The present invention relates to a cutting implement, such as a pair of secateurs.

Conventionally, secateurs include a pair of handles pivotable with respect to one another, one of the handles carrying a cutting blade, and the other handle either carrying a second cutting blade, which crosses over relative to the first cutting blade, similar to a pair of scissors, or an anvil against which the material to be cut is pressed by the cutting blade. These known forms of secateurs are normally arranged so that the second cutting blade or the anvil, as the case may be, are manufactured separately from the handle to which they are attached, and are secured thereto usually by riveting. Such secateurs are relatively expensive to manufacture and it is difficult to replace or sharpen the cutting blades.

It is now proposed, according to the present invention, to provide a cutting implement comprising first and second handles, a pivot connecting said handles for relative pivotal movement between an open position and a closed position, a removable blade mounted on said first handle, a member on said second handle disposed to co-operate with said blade, to provide a cutting action therewith upon said handles being pivoted towards one another, co-operating detent means on said removable blade and said first handle and a spring positioned to urge said detent means in to engagement, whereby movement of said blade towards said member, with said handles held in said open position, and against the action of said spring means, releases said detent means, enabling said blade to be removed.

With such a construction it is possible readily to remove the cutting blade and either replace it with another, or to sharpen it while it is out of the secateurs.

The blade may be provided with a pair of parallel fingers, which extend away from the free end of the blade, and which pass within the first handle on either side of the pivot. This enables the blade to be removed, once the detent has been released. The detent may take the form of a notch in one of the fingers and a projection on the first handle. It would also be possible to provide some form of projection on one of the fingers and a notch in the handle or any other system whereby the blade and the first handle have interengageable parts which normally prevent the blade from being removed.

In a preferred construction, in order to reduce expense, the spring comprises a leaf spring which is carried by the second handle and bears against the other finger, to urge the blade towards the projection and also serving to urge the handles towards the open position. Thus the leaf spring serves two purposes, firstly to hold the blade in position and secondly to urge the handles apart.

The other handle may include an aperture adjacent to the leaf spring which enables a pin to be passed therethrough to hold the spring in a position permitting the other finger to be placed in the position under the spring, when one is trying to replace the spring.

When a member is an anvil it may be formed in one piece with the anvil. Thus, according to another aspect of the invention, there is provided a cutting implement comprising first and second handles, a pivot connecting said handles for relative pivotal movement between an open position and a closed position, a blade mounted on said first handle and an anvil formed in one piece with said second handle.

The anvil may in fact be formed by bending two portions of the second handle in opposite directions, so that they both lie in a plane substantially perpendicular to the blade. Thus, the whole handle assembly including the anvil may be formed simply by bending sheet metal stock and by welding it together.

In order that the invention may more readily be understood, the following description is given, merely by way of example, reference being made to the accompanying drawings in which:

FIG. 3 is an end elevation, partly in section, of the secateurs according to FIG. 1.

Figure 1:
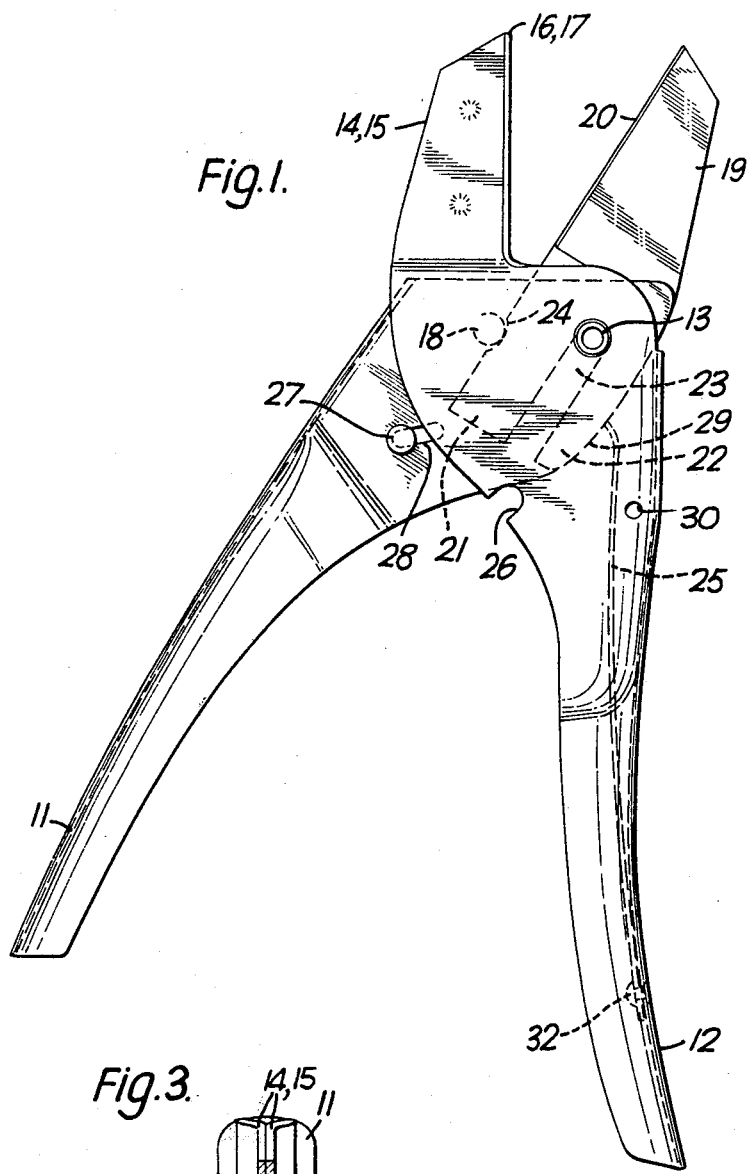
FIG. 1 is a side elevation of one embodiment of secateurs according to the invention, shown in the open position.
Figure 2:
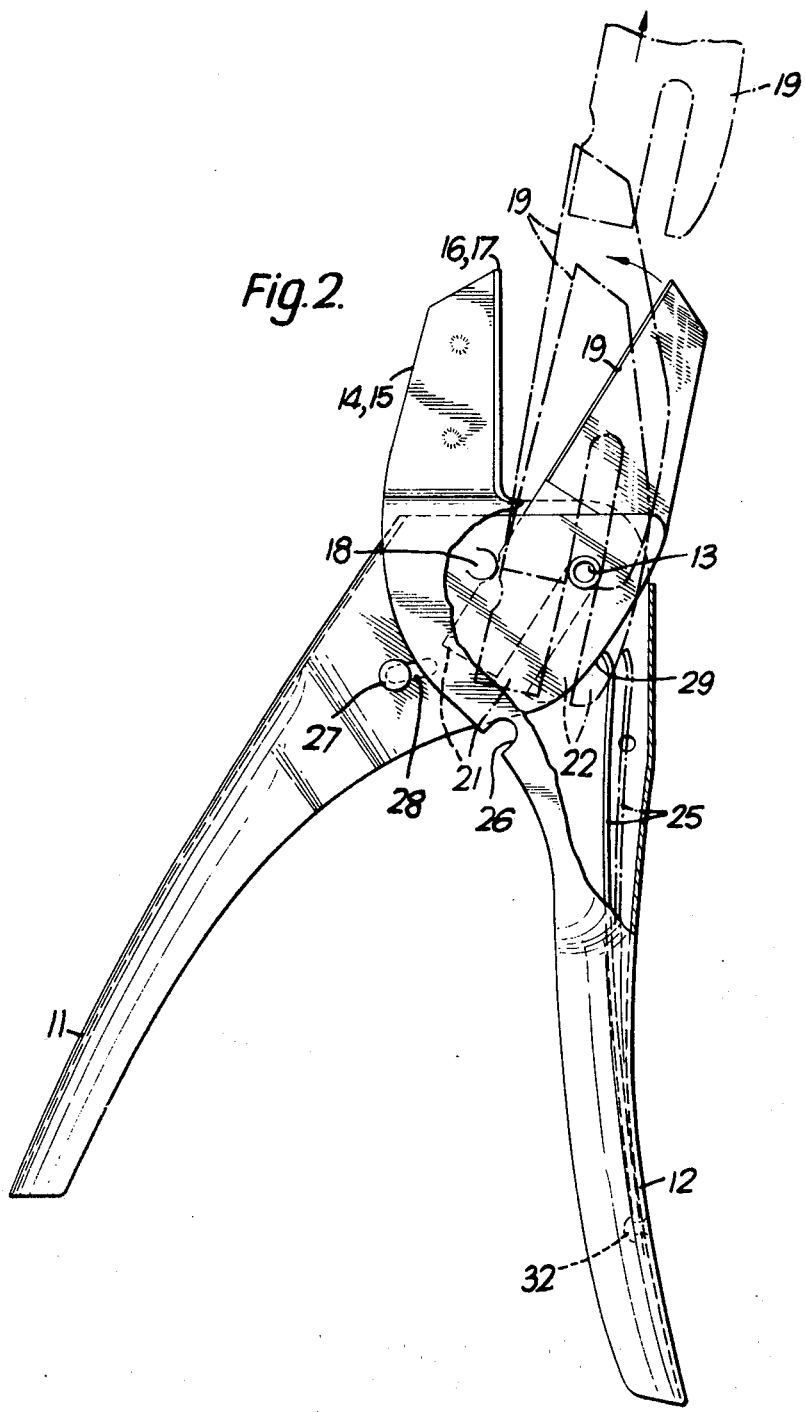
FIG. 2 is a view similar to FIG. 1, with a part of the second handle broken away, showing the removable blade in its locked position, the blade being shown in phantom in its unlocked positions.

Referring first to FIGS. 1, 2 and 3, there is illustrated a pair of secateurs including first and second handles 11 and 12 pivoted together by a rivet 13 or other suitable pivot means. Both the first and second handle are formed by rolling over, in a U shaped configuration, blanks of sheet metal stock. The two arms of the U of the first handle 11 are arranged to be closer together, so that they can fit between the two arms of the second handle 12. At its upper end, the second handle is further deformed to provide two adjacent portions 14 and 15 which are then bent outwardly at 16 and 17 to enable them to extend in a plane which is parallel to the axis of the pivot 13 and perpendicular to the blade to be described later. The two portions 14 and 15 are spot welded together to form a unitary structure. Thus the portions 14, 15, 16 and 17 form an anvil on the second handle 12, which is formed of the same stock as the second handle and in one integral piece therewith.

The first handle 11 is provided, on each arm of the U which extends between the two arms of the U of the second handle with an inwardly extending projection 18. A releasable blade 19 of hardened or stainless steel has a cutting edge 20 and, substantially parallel to and extending away from the cutting edge, a first and a second finger 21 and 22, respectively, defining therebetween a slot, the width of which is equal to the outside diameter of the rivet 13. On the first finger 21, spaced from the cutting edge 20, is a notch 24 positioned to engage the projection 18.

A leaf spring 25 is secured at 32 to the second handle 12 and extends within the U shape thereof. The free end of the leaf spring 25 normally bears against the outside of the second finger 22 and this urges the blade 19 to pivot in a clockwise direction, as viewed in FIG. 1, about the pivot 13, so that the notch 24 is held in an engagement at all times with the projection 18. The spring 25 also serves to urge the handles apart and thus the cutting edge 20 away from the anvil.

Formed in each leg portion of the handle 12 is a recess 26 and a retaining pin 27 which can slide in a slot 28 in the first handle 11, is engageable therein.

When it is desired to remove the blade 19, the secateurs are moved to their open position and may be retained in this position by the pin 27 being engaged in a further recess (not shown). One then grasps the blade 19 and pivots it about the rivet 13 towards the anvil and against the action of the spring 25. The effect of this is to disengage the notch 24 from the projection 18 and a sliding movement, upwardly in FIG. 1, will simply pull the blade out from beyond the rivet 13 to release it completely from the secateurs.

When, on the other hand, one wishes to replace the blade, the secateurs are moved to their closed position. In this state, the spring is urged by the portion 29 of the first handle flush against the inside of the U shaped handle 12. This handle is provided with an aperture 30 through which one then passes a pin, such as a nail or some other suitable implement, the pin serving to hold the spring in the position illustrated in FIG. 4. If the handles are then opened again, the blade can then be introduced, so that the spring engages to the right of the second finger 22. If the pin is then removed from the aperture 30, the secateurs then move to their open position and the spring 25 serves to urge the blade 19 in a clockwise direction, so that the notch 24 engages again behind the projection 18.

Figure 4:
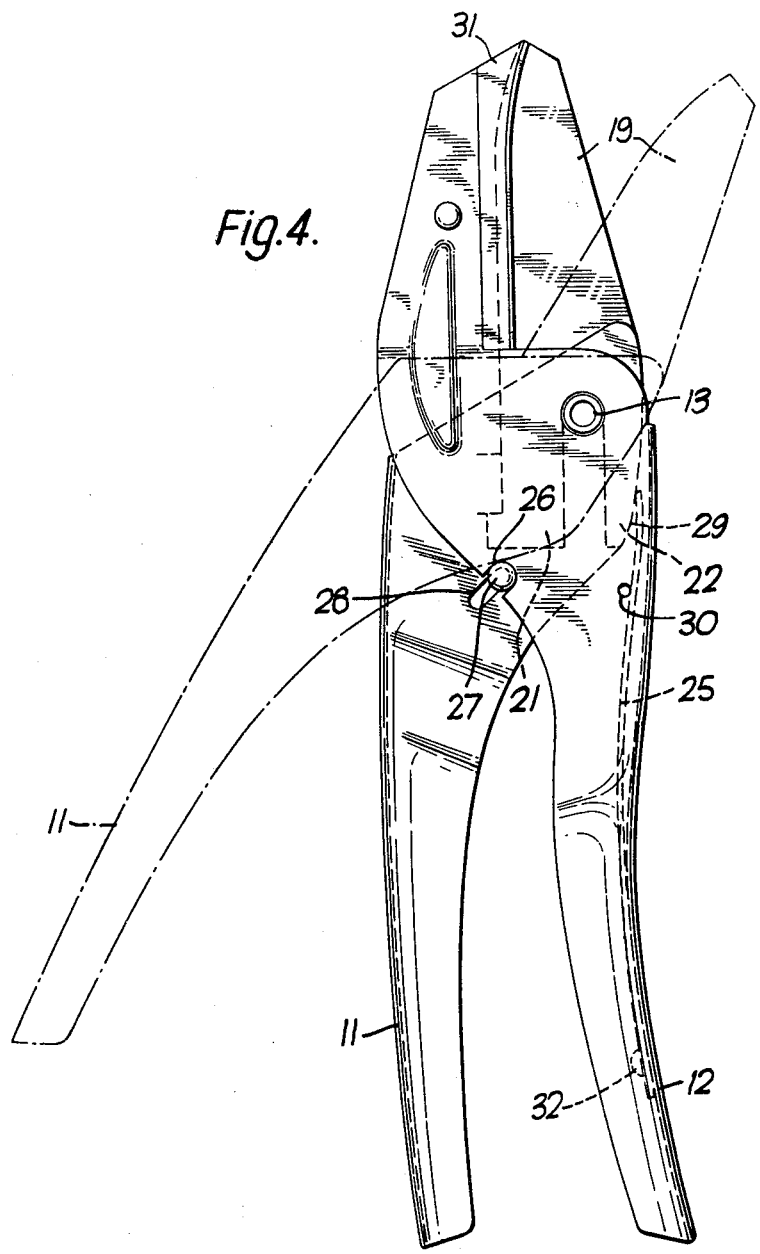
FIG. 4 is a side elevation of a second embodiment of secateurs according to the invention shown in the closed position, the one handle being shown in phantom in the open position.

The construction of FIG. 4 is essentially the same as that of FIG. 1, except that, instead of having an integral anvil, there is provided a separate blade 31 secured, in a conventional manner, to the upper end of the second handle e.g. by riveting. The shape of the second blade 31 is such that it overlaps the first blade 19 when the secateurs are moved to their closed position. The method of release of the blade 19 is exactly as previously described.

It is also contemplated that it will be possible to construct a pair of secateurs according to the invention in which the second blade is also removable in similar manner to the first blade 19.

It will be appreciated that by having the blade removable one can either be provided with a supply of such blades, or one can alternatively, re-sharpen the blades which would be substantially impossible to do satisfactorily with the blade still in position in the secateurs.

The construction of the present invention is relatively inexpensive to manufacture since the main parts of the secateurs, namely the handles, can each be made in one piece from sheet metal stock. Thus, in the construction of FIGS. 1, 2 and 3, there are only six components altogether, that is to say the first and second handles, the pin 27, pivot rivet 13, the spring 25 and the removable blade 19. The construction of FIG. 4 has an additional piece in the form of the second blade.

Although in the illustrated embodiment the detent mechanism has been illustrated as a projection 18 on the first handle and a notch on the removable blade, these could readily be reversed, on some other interengaging elements could be provided on the removable blade in the first handle. Furthermore, instead of using a single spring to move the handles to the open position and to hold the blade in position, two separate springs could equally be provided.

We claim:
1. A cutting implement comprising, in combination:
   a. a first handle;
   b. a second handle;
   c. a pivot connecting said handles for relative pivotal movement between an open position and a closed position;
   d. a removable blade mounted on said first handle;
   e. a member on said second handle disposed to cooperate with said blade, effective to provide a cutting action therewith upon said handles being pivoted towards one another said blade being movable relative to said first handle towards said member when said handles are in the open position;
   f. co-operating detent means on said removable blade and said first handle; and
   g. spring means positioned to urge said detent means into engagement, whereby said blade can only be removed by movement of said blade towards said member, with said handles held in said open position, and against the action of said spring means, effective to release said detent means, enabling said blade to be removed.

2. A cutting implement as claimed in claim 1, wherein said other member is an anvil.

3. A cutting implement as claimed in claim 2, wherein said anvil is formed in one piece with said second handle.

4. A cutting implement as claimed in claim 3, wherein said anvil is formed by bending two portions of said second handle in opposite directions, so that both lie in a plane substantially perpendicular to said blade.

5. A cutting implement as claimed in claim 1, wherein said blade is provided with a pair of parallel fingers, which pass within said first handle on either side of said pivot.

6. A cutting implement as claimed in claim 5, wherein said detent comprises a notch formed in one of said fingers and a projection on said first handle.

7. A cutting implement as claimed in claim 6, wherein said spring means comprise a leaf spring carried by said second handle and bearing against the other of said fingers, effective to urge said blade towards said projection and also serving to pivot said handles towards said open position.

8. A cutting implement as claimed in claim 7, wherein said second handle further comprises means defining an aperture therein, adjacent said leaf spring, effective to enable a pin to be passed through said aperture and hold said spring in a position permitting said other finger to be placed in position under said spring.

9. A cutting implement as claimed in claim 1, wherein said other member is a second blade.

10. A cutting implement comprising in combination:
   a. a first handle;
   b. a second handle formed of sheet metal stock;
   c. a pivot connecting said handles for relative pivotal movement between an open position and a closed position;
   d. a blade mounted on said first handle;
   e. two adjacent portions of said sheet metal second handle being secured together in face to face relation in a plane substantially perpendicular to said pivot; and
   f. two bent out portions of said adjacent portions, one bent out from each adjacent portion, so that they extend in opposite directions and both lie in a plane substantially perpendicular to said blade effective to form an anvil in one piece with said second handle.

* * * * *